FIG. 1

INVENTORS
MARVIN O. MARMORINE
LEWIS E. LAWSON
BY
Moore, White & Burd
ATTORNEYS July 4, 1967   M. O. MARMORINE ET AL   3,328,943
ASPARAGUS HARVESTER
Filed Oct. 29, 1962   9 Sheets-Sheet 8

INVENTORS
MARVIN O. MARMORINE
BY LEWIS E. LAWSON

Moore, White & Burd
ATTORNEYS

United States Patent Office 3,328,943
Patented July 4, 1967

3,328,943
ASPARAGUS HARVESTER
Marvin O. Marmorine and Lewis E. Lawson, Le Sueur, Minn., assignors to Green Giant Company, Le Sueur, Minn., a corporation of Minnesota
Filed Oct. 29, 1962, Ser. No. 233,587
26 Claims. (Cl. 56—327)

This invention is an asparagus harvester and is novel in that it provides selective harvesting on the basis of a multiple feeler system which recognizes asparagus stalks of a given height and then signals to the cutter support mechanism to selectively drop cutting elements wherever the selected asparagus stalks are sensed. The cutters then cut a selective swath and unless they receive continuing signals are retracted. The device is further novel in having means for holding the asparagus against being pushed in the direction of movement of the harvester in the event that the blades do not instantly sever the asparagus being harvested. Further novelty in the device resides in the conveying means, one end of which is pivotally secured to the frame of the harvester and the other of which is secured to the cutting structure so that the conveyor rises and falls with the movement of the cutter. The machine is also novel in that instead of attempting to cut individual spears it instead selectively cuts patches of asparagus in which one or more stalks are a given length are indicated by the feeler mechanism.

Accordingly, it is a principal object of this invention to provide a novel asparagus harvesting machine.

It is another object of this invention to provide an asparagus harvester that selectively cuts portions of an asparagus patch.

It is a further object of this invention to provide an asparagus harvesting machine that cuts the asparagus by reason of a cutting blade which once in cutting position is held stationary and cuts the asparagus by reason of the forward motion of the harvester.

It is a further object of this invention to provide an asparagus harvester that positively pushes cut asparagus into a conveyor as the asparagus harvester advances.

It is still a further object of this invention to provide an asparagus harvester which channels the asparagus into any of several paths each of which is provided with a separate cutting device.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 2 is a plan view of the structure with portions thereof broken away to illustrate construction; hidden portions are shown in broken lines; FIGURE 2 is drawn to a slightly smaller scale than FIGURE 1;

Figure 1:
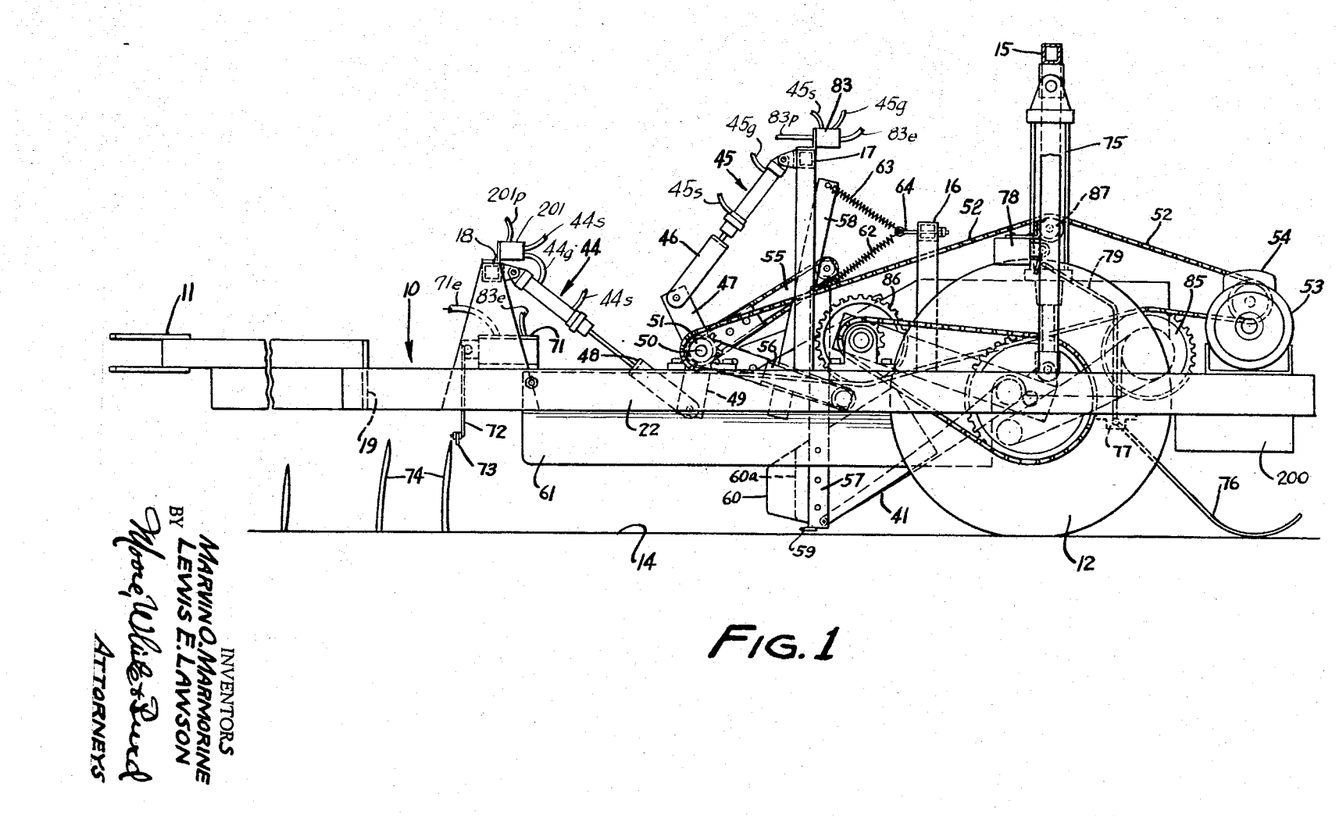
FIGURE 1 is a side elevation of the device with hidden portions shown in broken lines and other portions deleted to conserve space and illustrate the construction more fully.

Referring to the drawings and first to FIGURE 1, the unit is provided with a frame 10 having the usual hitch 11 and a pair of supporting wheels one of which appears at 12 in FIGURE 1. The device is shown resting on a line 14 representing a ground surface.

On the frame are several rigid members to which other members are anchored. In FIGURE 1 an end of one of these rigid members appears at 15 for the anchor from which the wheel suspension control means is supported. Other similar anchors are: the spring anchor 16, the rear cylinder anchor 17 and the forward cylinder anchor 18. All of these anchor members are rigidly secured to the frame by vertical members that are obvious and unnumbered in FIIGURE 1.

Figure 2:
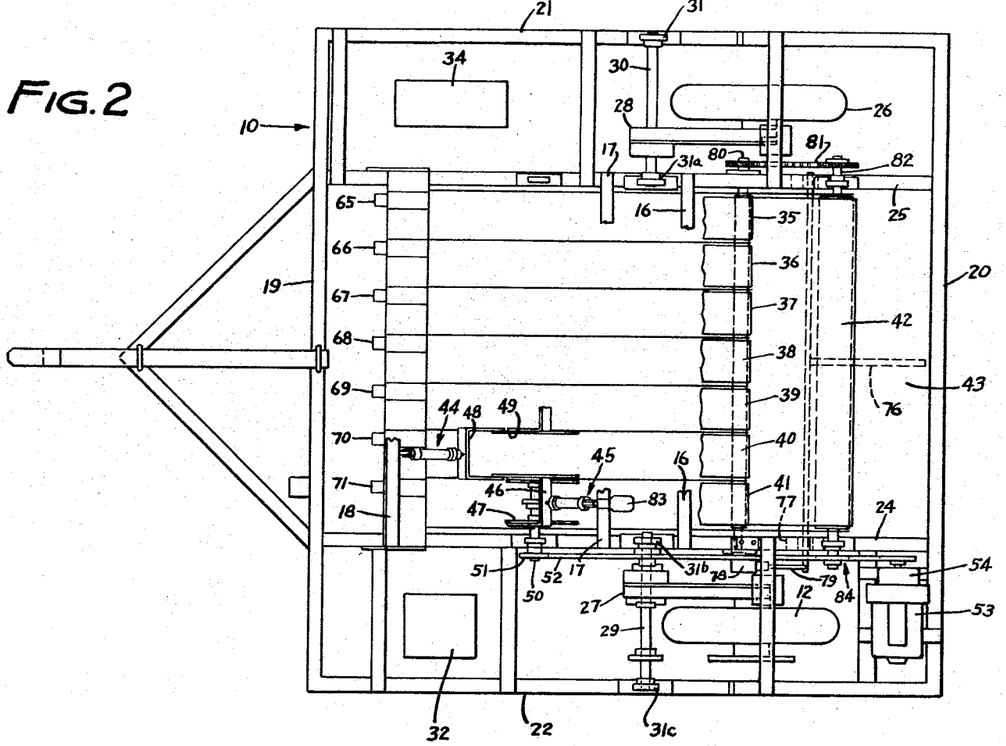

Turning briefly to FIGURE 2, for a closer examination of the frame, it consists of a series of main frame members 19 at the front and 20 at the back in parallel relationship. On the sides, are the units 21 and 22 in parallel relationship with each other and at right angles to 19 and 20 forming substantially a square between them. Spaced inwardly from 22 is an auxiliary frame member 24 and spaced inwardly from the side element 21 is an auxiliary frame member 25. The space between the outside frame members and the auxiliary frame members provide open wheel wells in which the wheels 12 and 26 are mounted pivotally by means of the arms 27 for wheel 12 and 28 for wheel 26. Each of these units is supported on a pivot post member 29 for wheel 12 and 30 for wheel 26 which are suitably supported in bearings and pillow blocks mounted on the main and auxiliary frame members in each case, which are all substantially identical and identified by the same number followed by an identifying suffix to distinguish them from each other; from top to bottom in FIGURE 2 they are 31, 31a, 31b and 31c.

Near tongue 11 at the righthand side in FIGURE 2 is a block outline representing the engine driven generator power supply designated 32 while a compressor is represented by the rectangle 34 at the left. These two units are conventional ones and, therefore, are represented only by these outlines in the plan view. Generator 32 supplies electricity for the electrical control system but also provides electricity to the electric motors one of which powers the compressor to operate the pneumatic system and the other of which drives the conveyor. In short, the power source is conventional and the invention is in no way restricted to the exemplary power source shown here.

In FIGURE 2 may be seen a series of narrow conveyors, numbered from top to bottom, 35–41. As these units are duplicative, they are shown only in fragment to show the location of the rear end discharge on to the large conveyor 42 which accepts material discharged from each of the conveyors 35–41 and conveys it to a storage unit positioned at 43.

In FIGURE 2, fragments of the control mechanism for the cutter structures may be seen generally at 45 for conveyor 40 and 46 for conveyor 41. As can be seen, the cutter units are arranged as to leave minimal space between them and it is easier, mechanically, to have the control units spread out by having alternate units secured to front support anchor 18 and alternate units secured to rear support unit 17.

Actuator 45 is secured to a yoke 46 which in turn controls or supports the bell crank 47 secured thereto and a similar yoke 48 and bell crank 49 is supported by the controller 44. Actually there are two bell cranks connected to the ends of the yokes, only two of them being numbered illustratively. At 50 is indicated a shaft about which the bell cranks 47 and 49 as well as similar bell cranks for the conveyors 35–39 are rotatably supported.

This shaft also serves to transmit power to a means for pushing the asparagus back against the cutting mechanism so that the asparagus will not be merely knocked over by the cutting mechanisms but will instead be severed at the base and fall rearwardly at the top. The support structure for these pusher units is shown in FIGURE 1; the one for control unit 45, yoke 46 and bell crank 47 being shown at 55 while the one for control unit 44, yoke 48 and bell crank 49 appears at 56. These structures will be explained in substantially greater detail in connection with the larger detailed views of FIGURES 3, 4 and 5. Shaft 50 has a sprocket 51 thereon which is powered by a chain 52 that is driven by a motor 53 mounted on the rear of the frame and appearing at the extreme right in FIGURE 1 and the upper righthand corner in FIGURE 2. Actually the chain is reeved around the sprocket on speed reducer 54 which in turn is driven by the motor 53.

The control power units such as those shown at 44 and 45 in FIGURE 1, by moving bell cranks 47 and 49, extend or retract cutter carrying arms for example at 57 and 58 shown in FIGURE 1. Extension occurs when the control unit 45 is collapsed in the position shown. Control unit 44 is shown holding the cutter retracted.

The cutter blades are at the bottoms of the arms 57 and 58 as appears at 59 positioned very close to ground line 14 when extended. Dividers such as the one 60 and its shorter companion divider 60a urge the asparagus within the area of a cutter blade 59 at the moment before being engaged by it. However, preliminary dividers 61 have already started forcing the asparagus to line up with one or the other of the cutters even before the dividers 60 make the final placement of the asparagus in the path of the cutter blade.

At 62 and 63 are shown springs that are suitably secured to spring anchor 16 as by eye bolts of which 64 is an example. These springs are secured to the upper ends of the cutter arms 57 and 58, respectively, and bias them toward anchor 16. Conveyors 41 and 40 are thereby held under proper tension, yet the blades may yield to get past obstructions.

Figure 4:
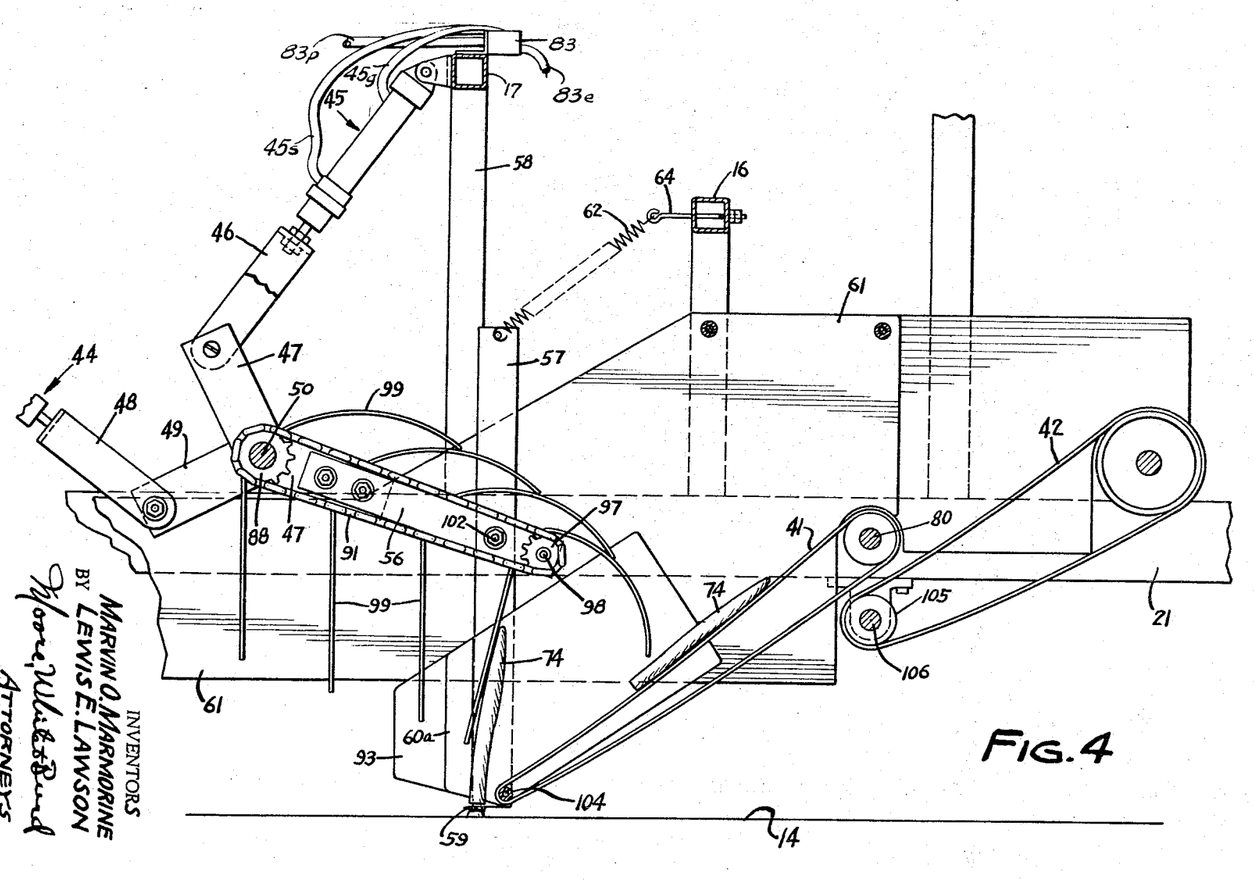
FIGURE 4 is a fragmentary side elevational view illustrating the cutting action of the device with hidden portions shown in broken lines; it is drawn to the same scale as FIGURE 3.

Directly below the member 18 which serves as an anchor for the forwardly facing control member such as those shown at 44 are a plurality of feeler switches. These are numbered consecutively from top to bottom 65–71. Each of these switches is connected to the generator of motor generator 32 by usual electrical wiring as shown at 71e in FIGURE 1. Each one of these feeler switches carries a feeler arm such as the one shown at 72 in FIGURE 1 and a feeler blade 73 extends across the path of the asparagus 74. This feeler blade 73 is of sufficient length to cover the space separated by dividers such as the one 60, 60a and 61 for any given cutter. Each of the switches controls a relay that in turn controls a valve as at 83 which admits air pressure through one or the other of the ends of the control unit cylinder for which the feeler is the control. Power to the electrical valve is supplied also by 71e. When asparagus as shown at 74 is tall enough to engage feeler blade 73, the forward motion of the harvester will carry the feeler blade 73 into contact with the asparagus. Further forward motion of the harvester will cause the feeler blade 73 to be pushed rearwardly to actuate the switch and cause it, via the relay (part of unit 71), to connect lead 71e to lead 83e to energize the electrically controlled valve in such a manner as to admit air to the end of the cylinder through which the piston rod extends. Valve 83 is a commercial valve having four parts and two positions. One part is connected by a commercially available hose 83p to compressor 34. This hose is connected to hose 45s when the valve 83 is electrically energized to retract the piston rod of control unit 45 and lower the controlled assembly as shown in FIGURE 4. At the same time, valve 83 vents hose 45g to the atmosphere. When the relay opens, the valve moves under the conventional spring tension to vent line 45s and connect 45g to 83p. Solenoid operated valves are per se no part of our invention and are old in the asparagus harvester art as shown in U.S. Patents 2,581,119, 3,176,456 and 2,690,043. The relays controlled by switches 65–71 are time delay units. There are many conventional types of time delay relays and one type described as exemplary has an air-dash pot which moves easily in the direction of energization of the relay but is allowed to move in the opposite direction only rather slowly. The relay may be adjusted to determine the length of time the relay remains "on." Thus the switch signals the relay to actuate the valve to lower the cutter blade for a period of time sufficient for blade 59 to reach asparagus 74 in FIGURE 1 before the signal given by the engagement of feeler blade 73 with asparagus 74 has ceased to cause the relay to function.

Furthermore, the switch constantly resets the relay. If before the circuit for lowering the blade is turned "off" the feeler engages the second asparagus stalk 74 which is tall enough to engage the feeler blade 72, a new time period will be initiated so that the cutter blade will continue to remain in a lowered position until the second of the two stalks shown ilustratively at 74 is severed. Whenever the feeler blade 73 fails to engage asparagus for a period of time greater than the period of its delayed reaction, however, the relay allows the control valve to return under spring pressure to its position which instantly connects line 45l to 83p which applies air to lengthen the cylinder of control unit 45 and raise the blade.

A valve is shown at 201 in FIGURE 1 which serves control unit 44 as valve 83 serves unit 45. Hose 201p connects valve 201 to the air supply of compressor 34 while lines 44s and 44g are connected to the piston rod and butt ends of the control unit cylinder 44 respectively. Hose 44s is connected to a part of valve 201 that is connected to hose 201p when the feeler blade for control unit 44 is engaged by asparagus.

These feeler switch and relay structures are well known to those versed in the art and consequently for the sake of convenience they have been regarded as a single unit and each switch and relay given a single number. Likewise the valves that are employed are standard units and consequently are neither shown nor described in detail herein, although, a representative unit appears at 83 in FIGURES 1, 2, 3, 4 and 5.

In FIGURE 1 also may be seen a wheel support cylinder 75 which is supported by the anchor member 15 at one end and at the other end is secured to a portion of the wheel mechanism near its axle. A feeler device shown at 76 and pivoted to frame member 22 may be adjusted to keep the frame at an elevation that is correct for the cutter mechanism. Suitable bearings support shaft 77 to which the feeler arm 76 is secured. Directly above the shaft are minimal movement control switches such as the one 78 in FIGURE 1, to which the shaft 77 is interconnected by appropriate linkage as at 79. As the frame moves up and down in response to an uneven ground surface, the arm 76 feels the surface of the ground and keeps the wheels at an elevation such that the frame members are supported a predetermined distance above the ground by actuating the switches to control, via conventional solenoid valves, oil to the wheel cylinders. An alternate location for feeler device 76 may be at the front end of the device with appropriate linkage to the wheel cylinders. Vehicle leveling devices are broadly old in the art and per se form no part of our invention.

All of the conveyors 35–41 are driven by a shaft shown at the top in FIGURE 2 at 80, and it is driven by being interconnected via chain 81 with the shaft 82 which transmits power to conveyor 42.

Shaft 82 is interconnected with chain 52 at its right-hand end as shown in FIGURE 2 at 84. This shows up in the form of a sprocket 85 over which chain 52 is reeved. Shaft 29 carries an idler sprocket 86 which is shown in FIGURE 1 and merely aids in directing the path of chain 52 in such a manner that all of the gears and sprockets actually driven by it are sufficiently engaged by the chain 52. Another idler sprocket of similar purpose is seen in broken lines at 87 in FIGURE 1.

Figure 3:
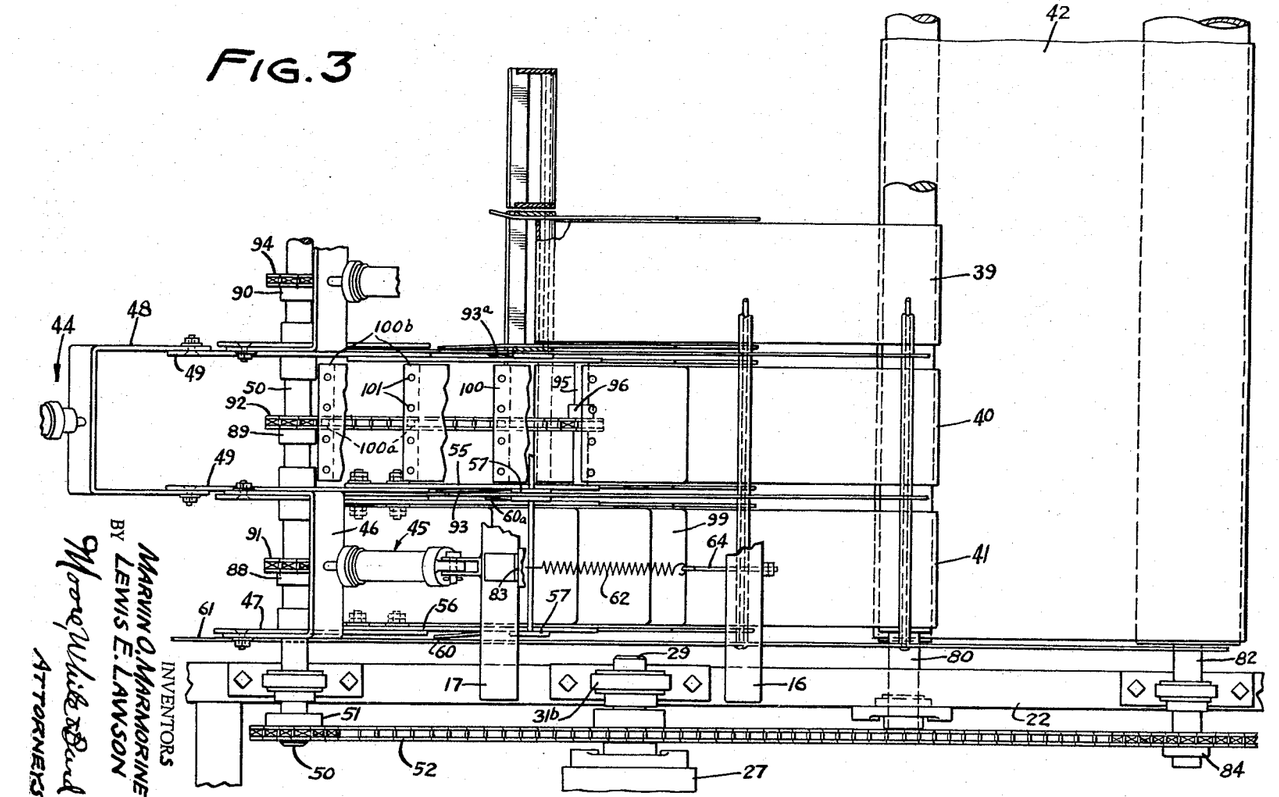
FIGURE 3 is a fragmentary plan view with portions broken away to illustrate construction and hidden portions shown in broken lines; it is drawn to a scale twice that of FIGURE 1.

In FIGURE 3, which is an enlarged fragmentary plan view of the cutter, pusher and conveyor structure, the shaft 50 is seen supporting a series of sprockets 88–90 which correspond to the three narrow conveyor systems 41, 40 and 39 respectively. Each of these sprockets has a chain 91 for sprockets 88, 92 for sprocket 89 and 94 for sprocket 90. The other ends of the chains 91, 92 and 94 are supported on shafts and sprockets such as the ones shown at 95 and 96 in FIGURE 3 with respect to the narrow conveyor 40. The shafts 95 are supported in the pusher structure framework 55 which in turn is secured to the end of the bell crank 49 that is remote from its point of attachment to the yoke 48.

Companion dividers 93 and 93a for blade 107 are comparable to dividers 60 and 60a for blade 59.

The structure appears clearly in FIGURE 4 in side elevation with respect to the narrow conveyor 41 wherein one of the pusher support members 56 is shown secured to the bell crank arm 47 which bell crank is pivoted about the shaft 50. Also in that figure, the sprocket 88 shows clearly as does the chain 91. At the righthand end of the support members 56 is the sprocket 97 (comparable to sprocket 96 of FIGURE 3) supported on shaft 98 (comparable to shaft 95 of FIGURE 3).

A plurality of at least mildly flexible vanes depend from the chains, and exemplary vanes or paddles appear in side elevation in FIGURE 4 at 99. As can be seen clearly in that figure, these vanes depend from the chain and engage the asparagus 74 to move its top back toward the conveyor 41 when the asparagus is being cut and immediately after it has been cut. When the chain 91 carries these elements over the top of the chain structure, the elements lie back as shown in that figure. These vanes may be also seen in fragment in FIGURE 3 where they appear at 100 with respect to conveyor 40. As may be seen in FIGURE 3, the vanes 99 and 100 extend entirely across the width of a cutter unit while the chain, of course, is only in the middle. As a result, a narrow lug 100a secured to the chain carries a bar 100b that extends out near to the edges of the paddles which are secured to the bar in any suitable manner as suggested by the pivot heads 101 in FIGURE 3. There are many suitable materials from which the pusher members 99 and 100 could be made, and a rubberized fabric has been found very satisfactory.

The cutter support arms such as 57 are pivoted on the pusher support structure such as the one 56 and a pivot for the arms 57 is clearly shown at 102 in FIGURE 4.

In that figure also the small idler roller for the conveyor 41 may be seen at 104. It is rotatably supported by the bottom of the cutter support members such as the one 57 and just above and behind the cutter blade 59 as is seen clearly in that figure.

In this figure, also, it is quite clear how the spring 62 maintains appropriate tension on belt 41 by yieldingly urging the top end of cutter support 57 toward spring anchor 16. This in turn tends to move the cutter knife forward as far as the tension on belt 41 will allow. At the same time, it is also clear that knife 59, by extension of spring 62, may yield rearwardly if the knife strikes an obstruction which it does not sever. As soon as the knife has passed the obstruction, however, it will again be pulled forward by spring 62 to resume its cutting position.

In FIGURE 4, the lower end of conveyor 42 is seen supported by a roller 105 which in turn is supported by a shaft 106. The end of the conveyor 42 supported by roller 105 will be seen to underlie and overlap the upper, rear end of conveyor 41.

Figure 5:
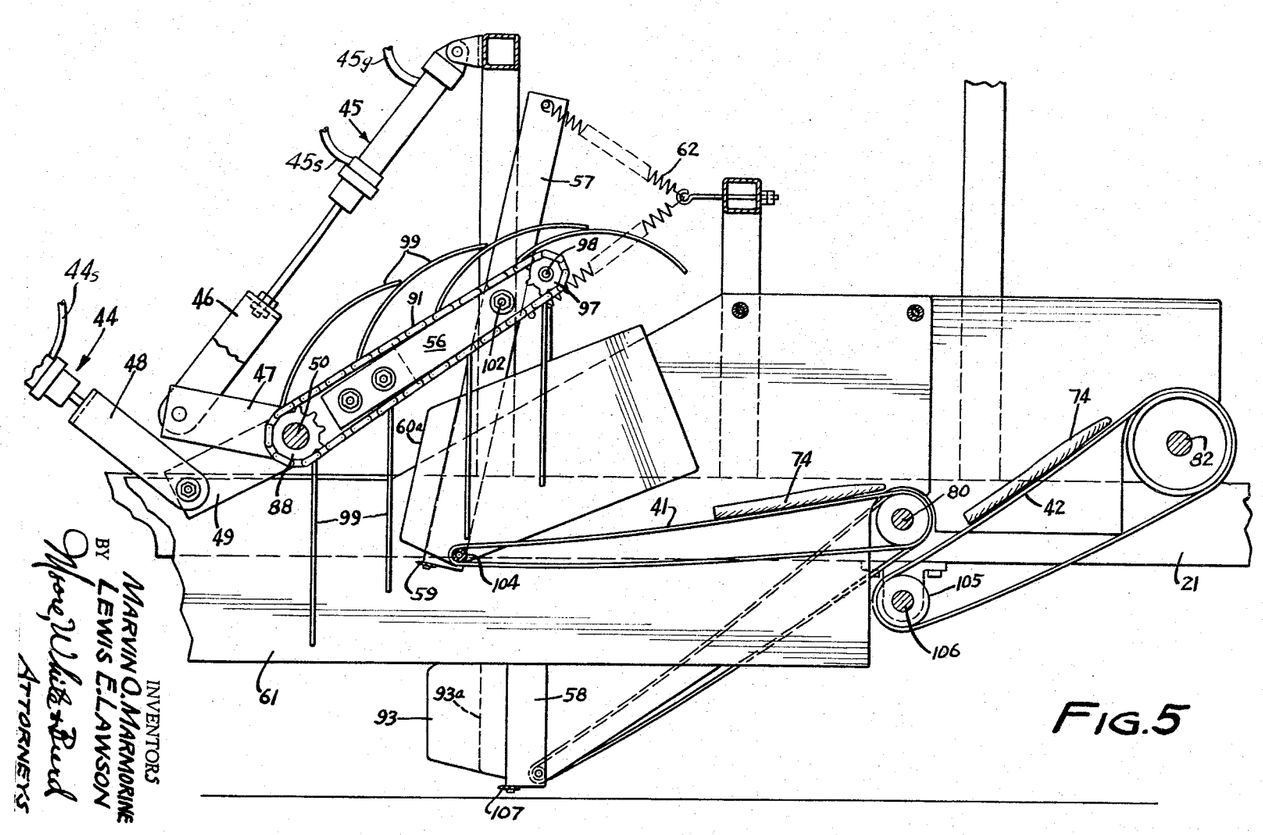
FIGURE 5 is a view similar to FIGURE 4 except that the device is shown in a different adjusted position of operation; it is drawn to the same scale.

With reference now to FIGURE 5, the cutter blade 59 has been raised by the extension of control member 45 and spring 62 continues to exert rearward pressure on the end of cutter supports 57 thereby keeping belt 41 relatively taut. The cut asparagus 74 has been conveyed rearwardly and has dropped onto the conveyor 42 to be carried to the back and dropped into the receiving container 200.

While the conveyors 35–42 appear in the drawings as solid web structures, it is possible to use open link type of conveyor chain belts for this purpose whereby undesirable pieces of dirt and the like which may slide over knives like the one 59 and work their way onto the narrow conveyors 35–41, will be sifted out before the asparagus is dumped into the container 200.

In FIGURE 5, also, it will be noted that control unit 44 still is in a collapsed condition. Thus, although the cutter supported and controlled by unit 45 has been raised, the cutter supports 58 are still in a down position and the blade 107 ready to cut.

Figures 6, 8, 9:
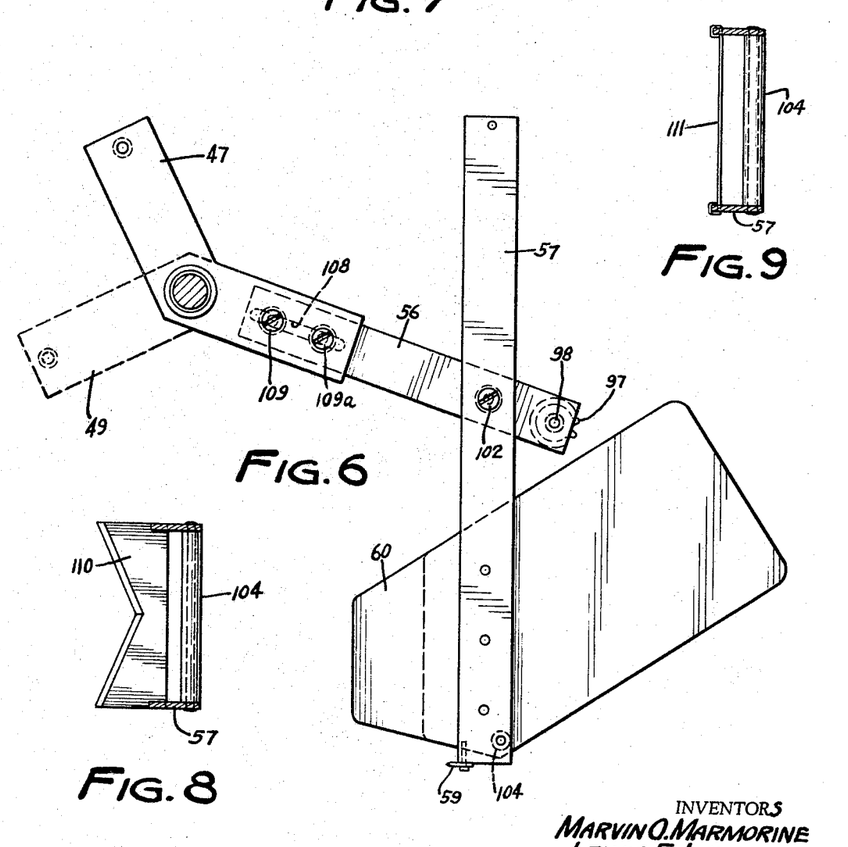
FIGURE 6 is a fragmentary side elevation of the cutting mechanism with broken lines illustrating a variation for different forms of the movement arm depending on whether the cylinders are mounted ahead of or behind the pivot point for the cutting mechanism motion arm; broken lines illustrate hidden parts and the scale used is larger than that of FIGURES 3, 4 and 5.
FIGURE 8 is a plan view of a modified form of blade drawn to the same scale as FIGURES 6 and 7.
FIGURE 9 is a second modified form of blade and drawn to the same scale as FIGURES 6 and 7.

In FIGURE 6, one of the units is shown in detailed enlarged side elevation, so that this portion of the structure is shown clearly. In this figure, it may also be seen that the asparagus pusher support 56 is adjustably secured to the bell crank 47 by any suitable means such as the slot 108 in the number 56 engaged by two suitable means such as the nut and bolt assemblies 109 and 109a so that proper tension may be retained on belt 91. Of course chain 91 is not shown but the idler sprocket 97 does appear. In the broken lines, the bell crank position 49 is shown which would be for a front actuated unit.

Figure 7:
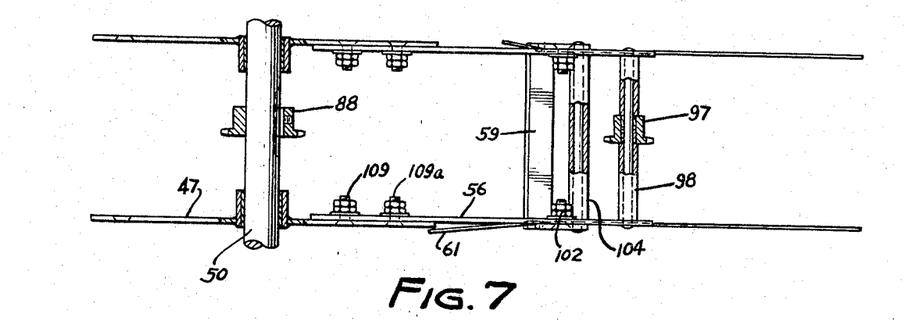
FIGURE 7 is a plan view of the structure illustrated in FIGURE 6 and shown partially in section; it is drawn to the same scale as FIGURE 6.

In FIGURE 7 the sprocket 88 on shaft 50 is seen aligning with the sprocket 97 on shaft 98. Also in this view, it can be seen that with the exception of the yoke, shafts, sprockets and blade, substantially all the structure that appears in side elevation in FIGURE 6 is duplicated for the opposite side of this same structure.

In FIGURE 8 is shown a modified form of cutting blade 110 which is different principally in having a shallow V-shape for its cutting edge when viewed in plan. The supports and conveyor roller have been assigned the numbers 57 and 104 as in the case of FIGURE 6 to make clear that blade 110 is in the same position as that occupied by blade 59 when the blade 110 is substituted for the blade 59.

In FIGURE 9 a still further modification of the cutter is shown at 111 as being a thin wire stretched taut between the supports 57. Roller 104 is shown in relative position with respect thereto.

Figures 10, 12:
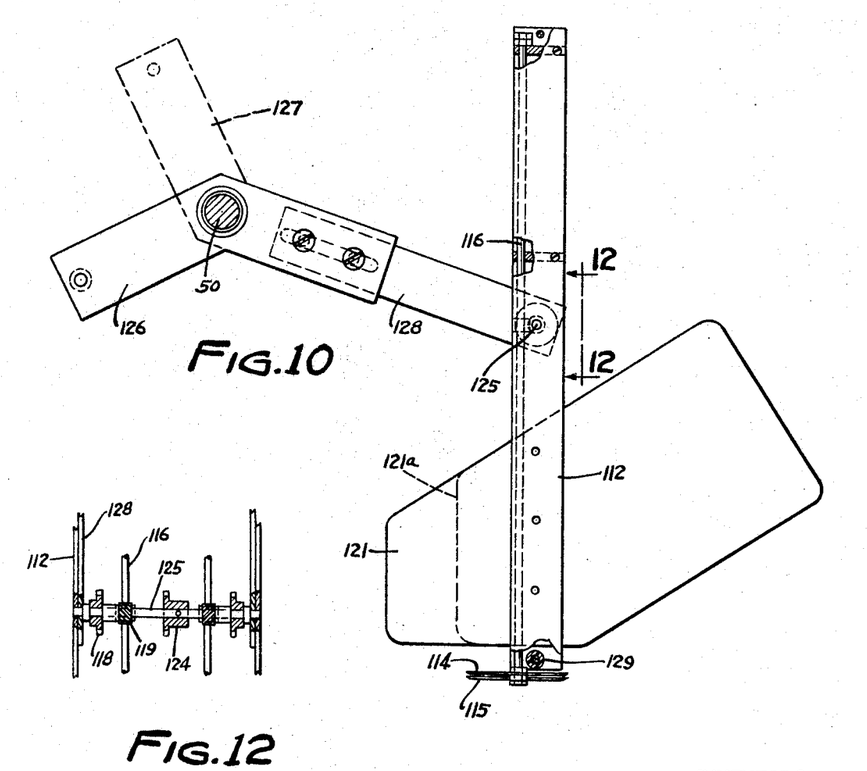
FIGURE 10 is a view similar to FIGURE 6 except that it illustrates a still further modification of the cutting mechanism; hidden portions are illustrated with broken lines.
FIGURE 12 is a fragmentary elevational view partially in section, taken on the line and in the direction of the arrows 12—12 of FIGURE 10.

In FIGURE 10, still a further modified form of the cutting structure is shown with a vertical support 112 comparable to the supports 57 and 58. The cutter consists of two rotating disc blades 114 and 115 respectively. They are each supported on shafts such as the one 116 for blade 114 and are driven from shaft 50 via sprockets and chains.

Figure 11:
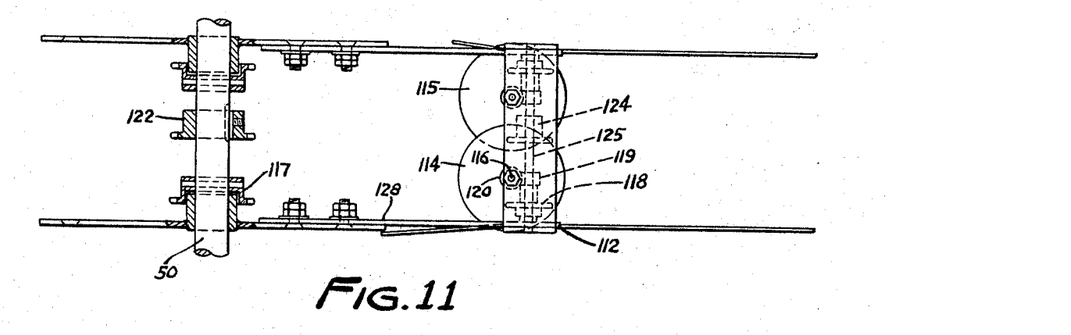
FIGURE 11 illustrates the structure shown in FIGURE 10 in elevation.

In FIGURE 11, the sprocket 117 is shown aligned with a broken line representation of sprocket 118. The sprocket 118 is interconnected with a worm gear 119 which in turn engages a gear 120 secured to shaft 116. Thus, whenever the shaft 50 is rotated, sprocket 117 is turned which via the chain and gears eventually drives the the blade 114. Identical structure may be seen on the opposite side for the blade 115. In this view, also, the divider 121 is shown with its companion short divider 121a. Between the two of them, they embrace the area within which the asparagus is to be captured and cut by a cutting structure between them.

The asparagus pushing structure has a large gear on the shaft 50 shown at 122 and a smaller gear that idles on the same shaft that carries the gear 118 and this shaft is identified 125 for clarity. The bell crank in these views is identified as 126 for the crank shaped for forward control and 127 if the end extends upwardly for a rear control element. The asparagus pusher support member is identified as 128 and now also serves as a support for the driving means for the two cutter blades 114 and 115.

FIGURE 12 is a partial front elevation, partial sectional structure embracing shaft 125 previously described with respect to FIGURES 10 and 11 as shown. Again in FIGURE 10 the roller 129 serves as a support for the forward end of the short conveyor associated with the cutting mechanism.

Figure 13:
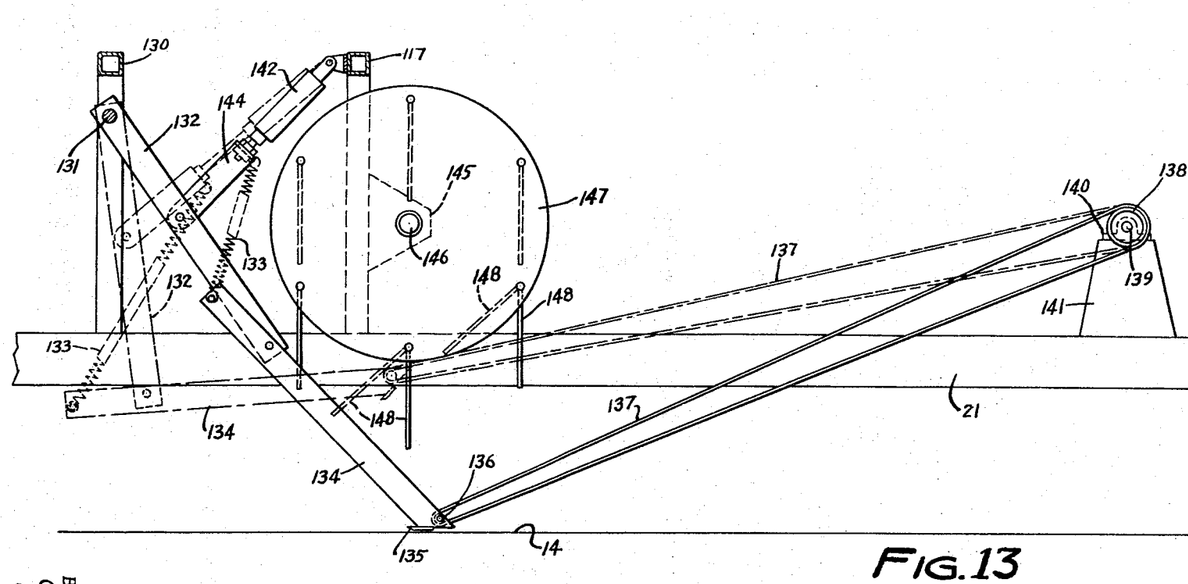
FIGURE 13 is a side elevation of a modified structure for the asparagus cutting, pushing and conveying mechanism; hidden elements and adjusted position of elements are shown in broken lines and the scale used is between that employed in FIGURES 1, 3 and 5.

In FIGURE 13 a variation of the entire cutting structure is illustrated. The frame element and the anchor for a rear control device is illustrated as having the similar numbers as in the principal drawings in order to orient this structure to the main frame assembly. Otherwise the parts are given new numbers as the structure varies substantially. Ahead of anchor 117 is an anchor structure designated 130 which carries shaft 131. On shaft 131 are pivotally supported a number of link elements, one of which is shown at 132. The links 132 are provided in pairs and they are pivotally interconnected with pairs of blade supporting arms shown at 134. Between them these blade supporting arms carry the blade 135.

Just to the rear of the blades is a roller member 136 which acts as an idler for the front end of conveyor 137. A roller 138 drives belt 137, and the roller is secured to any suitable shaft as at 139 which is supported in the usual pillow blocks 140. A stand 141 provides appropriate height above frame member 21 and the stand is rigidly secured to and supported by the frame member. Shaft 139 is driven by an arrangement like the motor 53 and speed reducer 54 in FIGURES 1 and 2.

A control mechanism such as those shown in the principal form of the structure is illustrated at 142 in solid lines in the position which lowers the blade 135 for cutting. In broken lines, this power means is shown in the extended or cutter lifting position and the cutter structure and conveyor are also illustrated in broken line. Power unit 142 may be interconnected with the link elements 132 by means of a yoke as previously illustrated, this one being designated 144 for the sake of clarity.

Figure 14:
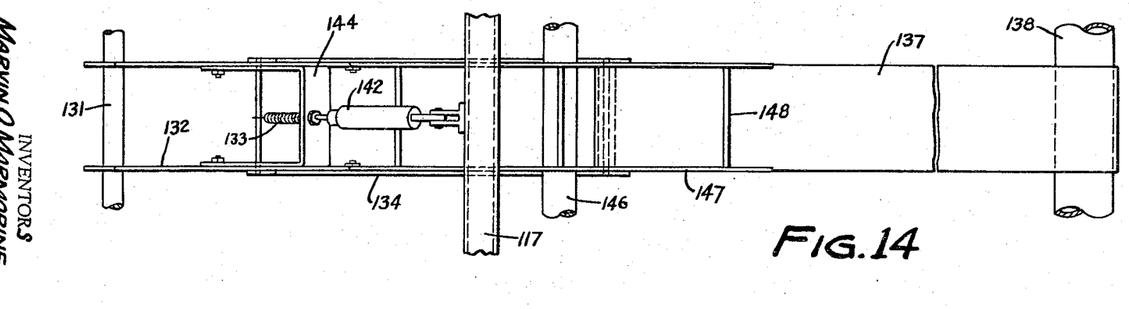
FIGURE 14 is a plan view taken on the line and in the direction of the arrows 14—14 of FIGURE 13; the broken lines illustrate hidden parts and the scale used is the same as that employed in FIGURES 3, 4 and 5.

Supported by the verticals that hold anchor member 117 are the bosses 145 in which a suitable shaft 146 is rotatably mounted. This shaft would be comparable to shaft 50 in the forms illustrated in FIGURES 1–12. This shaft rotatably supports drivingly a series of pairs of discs shown illustratively at 147 between which are pivotally supported the asparagus pusher paddles or the like 148. Not shown in these views are the feeler structure, the dividers, the time delay relays and the control valves which are identical with the structure illustrated in the other figures.

In general, this structure operates in the same manner as that shown in FIGURES 1–12. For example, the same control system for raising and lowering the cutters is used. Likewise the identical wheel elevation system may be employed. It has these differences. In the first place, the form of the invention illustrated in FIGURES 1–12 the asparagus pushing device gains an excess of momentum as the paddles 99 swing over the end of the chain at the forward end of the asparagus harvester and in some instances these paddles falling against the tender asparagus stalks, damage them. In the form of the device illustrated in FIGURES 13 and 14, the blades always engage the asparagus gently and are not likely to cause any injury. Furthermore, the conveyor structure illustrated has a much gentler slope to it so that there is not any tendency on the part of the asparagus, or "grass" as it is often referred to in the trade, to tumble back down the conveyor.

When the blade 135 strikes an obstruction, the support members 134 may yield rearwardly to allow the blade to glide over the obstruction, and it will be moved by tension of spring 133 back to its cutting position adjacent the ground surface 14 as shown in solid lines in FIGURE 13. When the unit has no signal to be in cutting position, the cylinder 142 extends as a result of air being directed to its upper end and in pushing the links 132 forward their lower ends are moved farther from the shaft 139 than when in the cutting position. As the result, the cutter blade and conveyor must assume a nearly straight line position in order to reach to the end of the links 132 and in so doing the cutter is raised above the ground and the conveyor is given a still milder angle. When the conveyor is up, as shown in the broken lines in FIGURE 13, the paddles 148 may yield to ride over the surface of the conveyor as shown in the broken lines in that figure.

Figures 15, 16:
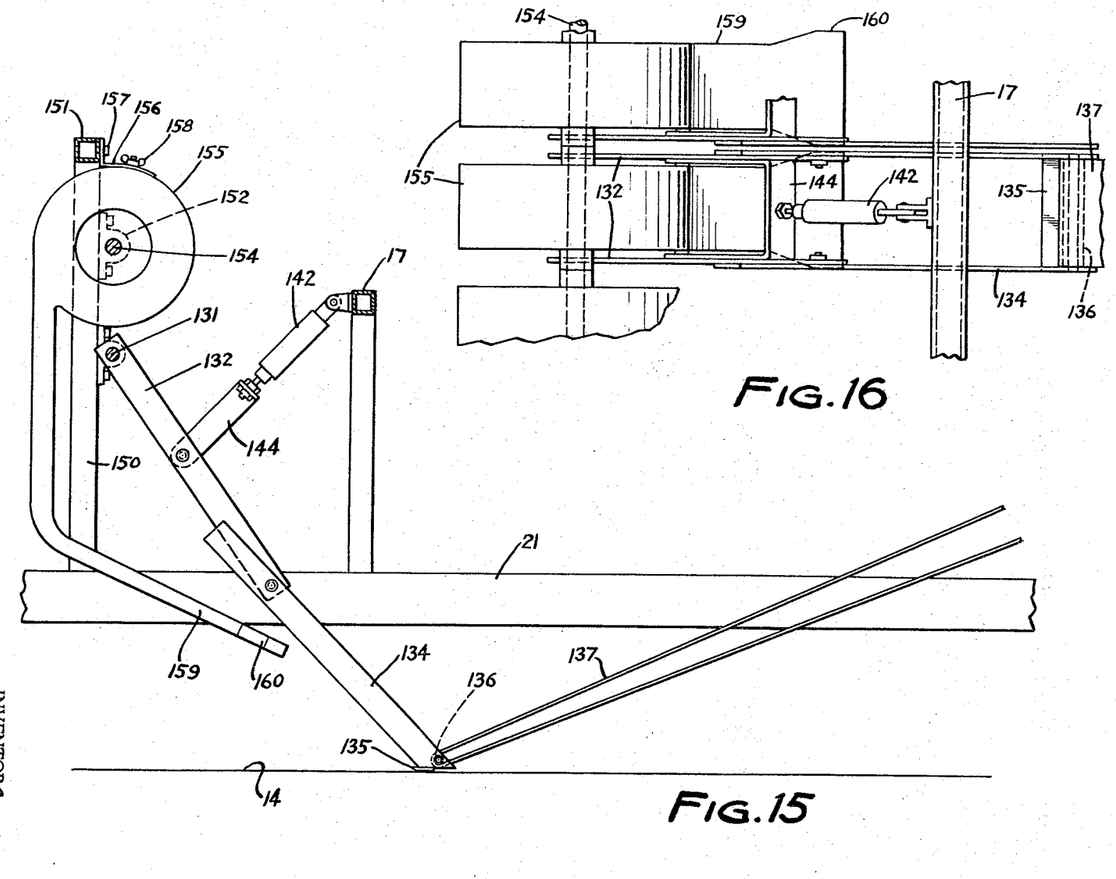
FIGURE 15 is a fragmentary side elevation of the cutter control structure shown in FIGURE 13 but in which a modified means for pushing the asparagus back into the cutter is provided; broken lines illustrate hidden parts.
FIGURE 16 is a fragmentary plan view of the modification illustrated in FIGURE 15 with broken lines illustrating hidden parts.

The elements in FIGURE 15 which are identical to those shown in FIGURES 13 and 14 are here assigned the reference numbers used in those figures, namely the frame 21, cylinder anchor 117, cylinder 142, yoke 144, pivot 131, linkage 132, linkage 134, the conveyor 137, its idler roller 136, the cutting blade 135, ground surface 14. In this form of the device, however, in place of using any kind of mechanical means to hold the asparagus against the cutter blade 135, one or more blowers are employed to create an air blast that performs this function.

Vertical supports 150 are provided and have secured to them cross members such as the one 150. Vertical supports 150 are interconnected at their tops by a beam member 151. Secured to verticals 150 are suitable bearing carrying pillow blocks 152 within which a shaft 154 is rotatably supported. The shaft is the central support for the impellers of a series of blowers such as the one shown at 155 in FIGURE 15. The housings for these blowers are supported in part by bearings surrounding shaft 154 but their position is also controlled in part by brackets such as the one shown at 156.

These brackets are rigidly secured to cross member 151 in any suitable manner as by the cap screws 157. A bolt is secured to blower 155 and extends through an elongated opening in bracket 156. Hence when the butterfly nut 158 is loosened, the housing 155 may be pivoted about shaft 154. The nozzle from blower 155 is elongated and represented at 159. It flares at its bottom end as shown at 160 and points at the general area where asparagus is being engaged by cutter 135. By loosening butterfly nut 158, the housing 155 may be pivoted to adjust nozzle 159 to the most effective angle. Shaft 154 is driven by a conventional structure that is neither shown nor described.

As shown in FIG. 16, the blower 155 provides an air blast for a single cutter structure and there are blowers arranged adjacent to it on each side, at least fragments which appear in FIGURE 16, illustrating how blowers are arranged for each of the various cutter units. Blower housing 161 may be seen clearly to have a flared end which allows the air blast to extend across the entire surface of the cutter path. While this modification is here shown with a separate blower for each unit and a separate intake for each blower, it is possible to use instead a blower in which a single blower housing was connected to a manifold and from the manifold distributed as blasts for the various cutting structures. This is merely a variation on the principal idea of using an air blast to hold the asparagus back against the cutter and prevent it from being shoved forward.

It is apparent that many modifications and variations of the invention as hereinbefore set forth may be made without departing from the spirit and scope thereof. The specific embodiments described are given by way of example only and the invention is limited only by the terms of the appended claims.

What is claimed:

1. An asparagus harvester including a mobile frame, a plurality of relatively narrow cutter elements movably secured to said frame for vertical movement with respect thereto, said cutter elements arranged side by side with their effective cutting edges in lateral extension across said frame with reference to its normal direction of motion, means for raising and lowering said cutter elements independently of each other, a feeler for each of said cutter elements secured to said frame a predetermined distance ahead of each cutter element, and conveyor means behind each of said cutter elements for accepting and conveying materials cut thereby to a point remote therefrom, and switch means including a delay device secured to said feeler means and for actuating said cutter elements raising and lowering means to a lowered position whereby a signal from said feeler causes its cutter element to be lowered for a predetermined period of time.

2. The asparagus harvester of claim 1 in which powered paddles positioned in advance of said cutter elements move toward said cutter elements, whereby asparagus engaged by said cutter elements are held against being pushed in the direction of motion of said harvester.

3. The structure of claim 2 in which said means is an endless chain supporting at least semi-flexible paddles of a width substantially equal to said cutter elements.

4. The structure of claim 2 in which said powered paddles are supported by a pair of spaced circular members and said paddles are pivotally secured therebetween.

5. The structure of claim 1 in which said cutter elements include sharpened blades.

6. The structure of claim 5 in which said blades are V-shaped at their cutting edge viewed in plan.

7. The structure of claim 1 in which said cutter blades are a pair of overlapping powered rotating discs.

8. The structure of claim 1 in which said cutter elements are taut wires.

9. The structure of claim 1 in which said frame is supported on a pair of wheels, means interconnecting said wheels and frame for altering their positions relative to each other, feeler means secured to said frame near said wheels and engaging a ground surface, control means secured to said feeler means, said control means and said wheel raising and lowering means being interconnected, whereby said frame is supported a predetermined distance above a ground surface.

10. The asparagus harvester of claim 1 in which said asparagus conveyors have one end associated with said cutting elements, whereby they raise and lower at one end with said cutting elements.

11. The asparagus harvester of claim 1 in which dividers are secured to said frame and extend forward to a point near said feeler means.

12. An asparagus harvester including a mobile frame, a plurality of pairs of spaced cutter supports movably secured to said frame for vertical movement, a plurality of cutters secured between pairs of said spaced cutter supports, said pairs of spaced cutter supports arranged side by side with minimum space therebetween in lateral extension across said frame with reference to its normal direction of motion, mechanical linkage pivotally secured to said frame and pairs of cutter supports, yokes pivotally connected to said mechanical linkage, actuators secured to said yokes and said frame, a feeler element secured to said frame in front of each of said cutters, time delay mechanisms secured to said frame and controlled by said feeler elements, valves controlling each of said actuators, said time delay mechanisms controlling said valves, and conveyor means behind each of said cutter elements for accepting and conveying materials cut thereby to a point remote therefrom.

13. The harvester of claim 12 in which dividers secured to said frame and said pairs of cutter supports channels asparagus into the path of one or another of said cutters.

14. The asparagus harvester of claim 12 in which means are positioned in advance of said cutters which move toward said cutters at a rate at least as great as the forward motion of said frame whereby asparagus engaged by said cutters are held against being knocked over in the direction of motion of said harvester.

15. The structure of claim 14 in which said means comprises support means secured to said mechanical linkage, longitudinally spaced sprockets on said mechanical linkage pivot and said support means, an endless chain reeved over said sprockets and at least semi-flexible paddles of a width substantially equal to said cutter secured to said chain at intervals.

16. The structure of claim 14 in which said means is a pair of spaced discs and paddles are pivotally secured therebetween.

17. The structure of claim 12 in which said cutter elements are blades V-shaped at their cutting edge viewed in plan.

18. The structure of claim 12 in which said cutter elements are a pair of overlapping rotating discs.

19. The asparagus harvester of claim 12 in which at least some of said conveyors have one end associated with said cutter supports whereby they are raised and lowered with said cutter elements.

20. The asparagus harvester of claim 12 in which said mechanical linkage are pairs of bell cranks, alternate pairs of bell cranks extending in opposite directions relative to their point of attachment to said frame, alternate actuators secured to said frame behind said bell cranks and the balance of said actuators secured to said frame in front of said bell cranks.

21. The asparagus harvester of claim 12 in which air blast means is secured to said frame near said cutters and arranged to direct the blast therefrom against asparagus in front of said cutters, said air blast means providing a force directed against asparagus in a direction opposite to the direction of motion of said harvester.

22. Apparatus spears for harvesting asparagus comprising a wheeled frame movable along an asparagus field, sensing means secured to said frame at a preselected height above the ground responsive to contact with asparagus spears of at least said preselected height, cutting means for cutting said spears pivotally secured to said frame for horizontal movement and engagement with said spears at the ground speed of said frame and further adapted for selective raising and lowering in response to a signal from said sensing means, means for raising and lowering said cutting means between preselected positions, means for holding and supporting said asparagus spears in substantially vertical position before and during cutting, and means for holding and supporting the severed asparagus spears after cutting for transportation to a storage area.

23. Apparatus for harvesting asparagus comprising a wheeled frame movable along an asparagus field, sensing means for contacting asparagus spears being at least a preselected height, electrical switch means communicating with said sensing means and responsive to actuation of said sensing means to produce a signal, cutting means pivotally secured to said frame for horizontal movement at the ground speed of said frame and adapted to be selectively raised and lowered, a time delay relay means responsive to said signal to produce a second signal of preselected time duration, means responsive to said second signal for lowering said cutter means to a preselected position, means for holding and supporting said asparagus stalks in a substantially vertical position before and during cutting, and means for holding and supporting severed asparagus spears after cutting for transportation to a storage area.

24. Method for harvesting asparagus spears of a preselected height whereby harvested spears of said preselected height and spears less than said preselected height are not damaged comprising (1) moving a wheeled frame asparagus harvester over an asparagus bed at a preselected ground speed (2) sensing spears have at least a preselected height by contacting said spears with a sensing means to generate a signal (3) holding and supporting said spears in substantially vertical position prior to cutting (4) lowering a cutting means from a preselected raised position to a preselected lowered position in response to signal from said sensing means (5) cutting said spears with said cutting means while said spears are held and supported in substantially vertical position by contacting said cutting means with said spears while said cutting means moves at the preselected ground speed of said moving frame and (6) transporting the cut spears to a storage area.

25. The asparagus harvester of claim 1 in which said conveyor means consists of a plurality of single long endless means each having one end supported by said cutting means and the other end supported rotatably at a fixed point on said frame.

26. The asparagus harvester of claim 12 in which said conveyor means consists of a plurality of single long endless means each having one end supported by said cutter supports and the other end supported at a fixed point on said frame.

References Cited
UNITED STATES PATENTS

| | | | |
|---|---|---|---|
| 1,334,933 | 3/1920 | Hamilton | 56—219 |
| 1,343,884 | 6/1920 | Hamilton | 56—220 |
| 1,578,162 | 3/1926 | Monthan | 56—327 |
| 2,084,049 | 6/1937 | Rosenvold | 56—219 |
| 2,581,119 | 1/1952 | Matteloi | 56—327 |
| 2,606,416 | 8/1952 | Bruner | 56—327 |
| 2,690,043 | 9/1954 | Marihart | 56—327 |
| 2,709,330 | 5/1955 | Lafferty et al. | 56—327 |
| 2,710,516 | 6/1955 | Kaesemeyer et al. | 56—158 |
| 2,767,544 | 10/1956 | Turkington | 56—327 |
| 2,903,839 | 9/1959 | Grew | 56—327 |
| 3,066,469 | 12/1962 | Chatagnier | 56—327 |

ABRAHAM O. STONE, *Primary Examiner.*

RUSSELL R. KINSEY, *Examiner.*